Sept. 9, 1941.                H. H. GORRIE                 2,255,284
                              CONTROL SYSTEM
                            Filed Dec. 3, 1938              2 Sheets-Sheet 2

Inventor
HARVARD H. GORRIE
By Raymond D. Junkins
Attorney

Patented Sept. 9, 1941

2,255,284

UNITED STATES PATENT OFFICE 2,255,284

CONTROL SYSTEM

Harvard H. Gorrie, Cleveland Heights, Ohio, assignor to Bailey Meter Company, a corporation of Delaware Application December 3, 1938, Serial No. 243,892

6 Claims. (Cl. 60—54)

This invention relates to apparatus for controlling the rate of output of variable ratio fluid transmission mechanisms, such as fluid, or more specifically hydraulic couplings.

Such couplings are interposed between a constant speed source of power, such for example as a synchronous motor, a turbine, or Diesel engine, and a preferably variable output driven device, such for example as a fan, pump, or wheels of a vehicle; and it is specifically an object of my invention to control the speed of the variable speed shaft of the coupling to maintain a desirable rate of output of the driven device.

In some cases the driven device may produce an agent directly or indirectly contributing to the product of or maintenance of a condition, such as temperature, pressure, level, rate of flow or electromotive force. My invention contemplates regulating the rate of production of the agent by control of the coupling to maintain the condition at a desired predetermined value. For example, it is desirable to vary the rate of supply of the elements of combustion to a vapor generator in accordance with the demand for vapor as indicated by changes in vapor pressure. In accordance with my invention the rate of output of the air and fuel supply means may be varied to maintain a desired vapor pressure by controlling a hydraulic coupling interposed between such means and their driving elements.

It is an object of my invention to provide a coupling control wherein the actual output speed of the coupling follows promptly and accurately desired changes in the speed without overtravel or hunting.

Another object of my invention is to provide a control system which will cause the actual rate of coupling output to correspond substantially with the desired rate even during transient periods while the desired rate is changing.

Still another object of my invention is to provide a control system wherein the rate of change in coupling output is determined in part by the magnitude of the change in output desired and in part by the rate of change in desired output.

A further object of my invention is to provide a control system wherein the rate of change in coupling output is varied in asymptotic relationship with the approach of the actual rate of output to the desired rate of output so that overshooting and hunting is avoided.

In the drawings:

Figs. 2, 3, 4 and 5 are graphs illustrating operating characteristics of my control system.

Fig. 6 is a sectional view to an enlarged scale of an adjustable bleed valve.

Figure 1:
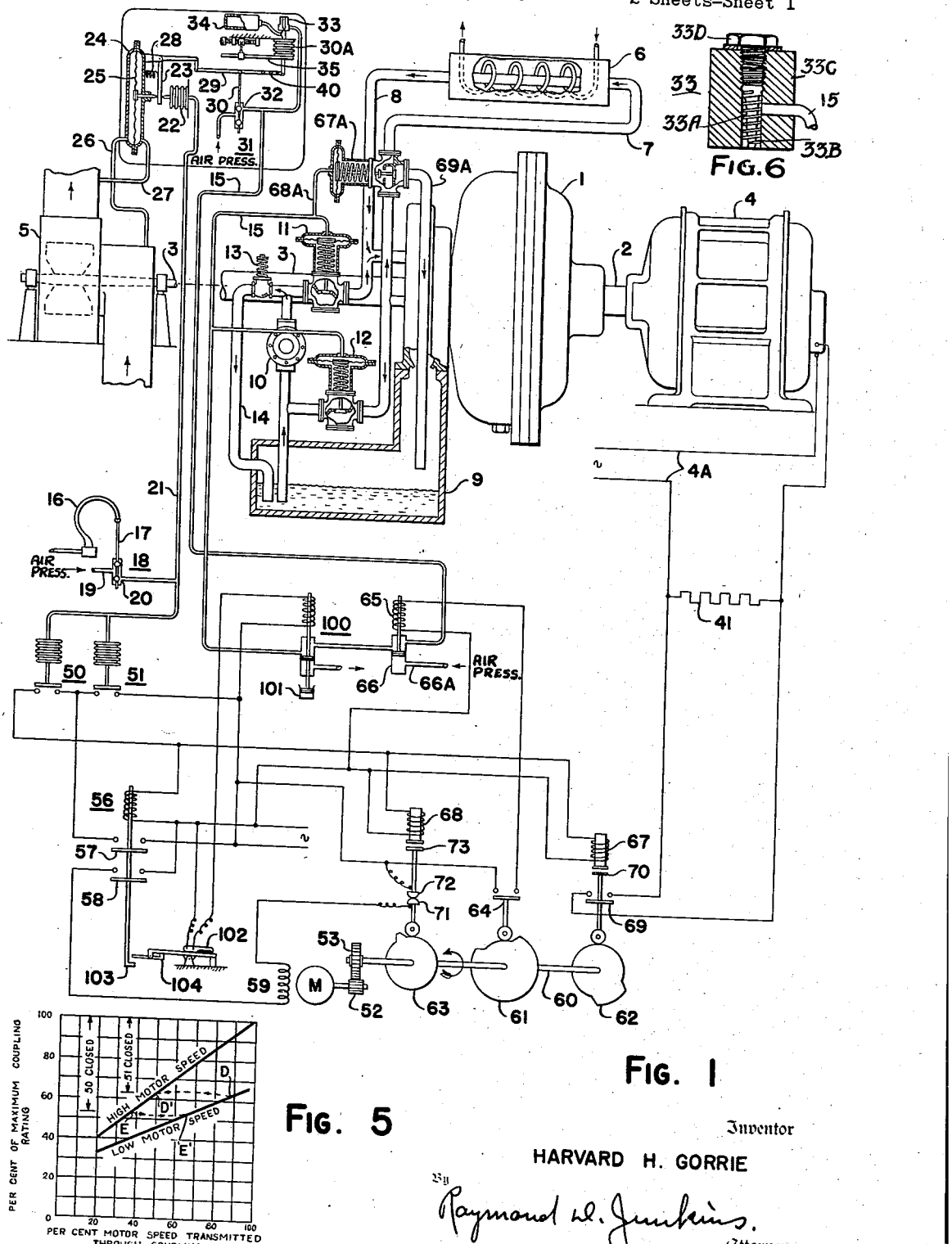
Fig. 1 is a schematic illustration of a control system embodying my invention.

Referring to Fig. 1, I have therein shown a hydraulic coupling 1 adapted to receive power from an input shaft 2 and to deliver power to a variable speed output shaft 3. The input shaft 2 may be driven from any desired source of power, such as a reciprocating engine, electric motor, Diesel engine, steam turbine, or the like. For purposes of illustration I have shown it as being driven by a multispeed motor 4. Likewise the variable speed output shaft 3 is adapted to actuate a driven device such as a fan, pump, transmission system, stoker, feeder, or in fact any power utilizing device. In the embodiment of my invention I have chosen to describe I show the output shaft 3 as driving a fan 5.

As known, the percent of the motor speed transmitted through the coupling varies in accordance with the amount of fluid in the coupling, and changes in the speed of the output shaft may be made by varying the quantity of fluid in the coupling. To avoid overheating, the fluid used in the coupling is caused to continuously pass through a working circuit, which includes a cooler, such as I have illustrated at 6. It will be noted that fluid from the coupling passes through a pipe 7 to the cooler 6 and is returned to the coupling through a pipe 8.

A reservoir 9 is provided for excess fluid. When it is desired to increase the output the coupling fluid is transferred from the reservoir to the working circuit of the coupling. Conversely, when it is desired to decrease the output of the coupling fluid is transferred from the working circuit to the reservoir. The means I have provided for effecting the transfer of fluid comprises a continuously operating pump 10, and oppositely acting diaphragm motor valves 11 and 12 normally disposed in a substantially closed position. When the coupling output is constant, fluid drawn by the pump 10 from the reservoir is returned thereto through a pressure regulating valve 13 and a pipe 14. Under the condition of constant coupling output a constant predetermined fluid pressure transmitted through a pipe 15 is impressed on the diaphragm motors of valves 11 and 12 sufficient to hold them in the closed position. By means hereinafter to be described when it is desired to increase the coupling output some predetermined amount the fluid pressure is initially decreased correspondingly, thereby causing the valve 11 to partially open while the valve 12 remains closed. Fluid is then transferred from the reservoir to the working circuit at a rate correponding to the amount of valve opening, or inferentially at a rate proportional to the decrease in fluid pressure from the predetermined value. A decrease in coupling output is effected through an increase in fluid pressure transmitted to the diaphragm motors of valves 11 and 12, thereby causing the former to remain closed and the latter to open, withdrawing fluid from the working circuit and returning it to the reservoir. In general, it may be said therefore that the difference in magnitude of the fluid pressure from the predetermined value within the pipe 15 determines the rate of change of coupling output in that it determines the position of the valves 11 and 12, and thereby effects transfer of fluid from and to the working circuit at a corresponding rate. As will be apparent to those skilled in the art the valve members of valves 11 and 12 may be shaped to give any desired functional relation between the magnitude of the fluid pressure in the pipe 15 and flow of fluid.

In Fig. 1 I have shown my control system adapted to control the coupling output in accordance with the magnitude of a condition which may be partially or wholly maintained by the power utilizing device driven by the output shaft. If, for example, the fan 5 supplies air to the combustion chamber of a steam generator then in accordance with my invention the speed of the output shaft 3 is controlled to vary the rate of air supply in accordance with vapor pressure. However, this is merely an example and not a limitation, for my invention may as well be put to any other of a wide variety of uses.

As representative of devices which may be positioned by a controlled condition, such as vapor pressure, I have shown at 16 a Bourdon tube from which depends a movable valve member 17 of a pilot valve 18 of the type forming the subject matter of the patent to Clarence Johnson, No. 2,054,464. The movable valve member 17 is provided with lands of slightly less diameter than the passageway extending longitudinally through the valve and which opens to the atmosphere at either end. Pressure fluid such as compressed air is admitted to the passageway through a centrally located inlet port 19 and in being discharged through the passageway produces a pressure gradient across the lands. The loading pressure established at an outlet port 20 will therefore depend upon the position of the valve member, and accordingly upon the magnitude of the condition to which 16 is responsive.

As the valve member 17 is positioned upwardly, the pressure established at the outlet port 20 will decrease, and conversely as the member is positioned downwardly the pressure will increase. Normally, that is at one given position of the Bourdon tube 16 corresponding to the desired magnitude of the controlled condition, a pressure of predetermined value will be established at the outlet port 20. The loading pressure established by the pilot valve 18 is conducted through a pipe 21 to an expansible contractible bellows 22, which serves to exert a force on a bell crank 23 proportional to the magnitude of the fluid pressure.

In general, the control system I have disclosed is arranged to establish a loading force corresponding to the desired rate of coupling output, a control force corresponding to the actual rate of coupling output and means under the joint control of the forces for varying the actual rate of output to maintain it equal to the desired rate. As I have indicated the coupling shown in Fig. 1 as driving a fan, as a measure of coupling output I may use the rate of fluid flow produced by the fan. Therein I show a fluid flow meter comprising a casing 24 divided into two chambers by a flexible diaphragm 25 connected by pipes 26 and 27 to the fan 5 so as to be responsive to a differential varying in functional relation to the rate of fluid flow produced by the fan. It will be evident to those skilled in the art that other factors rather than differential pressure may be used to obtain a measure of coupling output. For example, the speed of the output shaft 3 may in some instances be more conveniently used than the differential produced by fluid flow.

The diaphragm 25 exerts a force on the bell crank 23 acting in opposition to the force exerted by the bellows 22. When the two forces are equal or stand in predetermined proportion, the bell crank 23 will assume a predetermined position, which fore convenience may be termed the "neutral position." Movement of the bell crank 23 from the neutral position will be proportional to the difference in forces exerted by the diaphragm 25 and bellows 22 by virtue of a spring 28, so arranged that when the force produced by the bellows 22 predominates the bell crank 23 will be positioned in a clockwise direction a proportionate amount, and conversely when the force produced by the diaphragm 25 predominates the bell crank 23 will be positioned in a counterclockwise direction from the neutral position a proportionate amount.

The bell crank 23 is pivotally connected to one end of a differential beam 29, the opposite end of which is positioned by an expansible contractible chamber or bellows 30A. Pivotally connected intermediate the ends of the beam 29 is a valve member 30 of a pilot valve 31, similar to the pilot valve 18. As shown, the outlet port 32 of the pilot valve 31 is made adjacent the upper land of the movable member 30, so that upon the member being positioned upwardly the pressure at the outlet port increases, and conversely upon the member being moved downwardly the pressure decreases. The outlet port 32 is connected to the pipe 15, which as heretofore described leads to the diaphragm motors of valves 11 and 12. Accordingly, it is the fluid pressure produced by the pilot valve 31 which determines the position of the valves, and hence the rate of increase or decrease of coupling output.

The expansible contractible bellows 30A is connected to the pipe 15 through an adjustable bleed valve diagrammatically indicated at 33, and is also in communication with a volume chamber 34. Changes in pressure within the bellows 30A cause proportionate changes in position of the member 29. The ratio between changes in pressure within the bellows 30A and changes in position of the member 29 may be varied by changing the effective length of a spring 35, which opposes the force produced by the fluid pressure within the bellows 30A. Likewise the change in position of the valve member 30 effected by changes in position of the bell crank 23 relative to changes in position effected by the bellows 30A may be adjusted or varied by varying the distance between the point of connection of the member 30 and pivot connection between the beam 29 and bellows 30A. For convenience, a plurality of holes 40 in the beam 29 are shown, to any of which the bellows 30A may be connected.

The adjustable bleed valve 33 is shown in section in Fig. 6. A capillary channel 33A is formed by the spiral thread of a screw 33B the length of which, and hence the resistance of which, may be varied by positioning it in a block 33C. A screw plug 33D prevents the leakage of pressure fluid to the atmosphere. It is evident that the length of time required for the pressure within the bellows 30A to reach equilibrium with that established by the pilot 31 may be varied to suit the characteristics of the system by properly adjusting the screw 33B.

Assuming that the Bourdon tube 16 is position in a counterclockwise direction, indicating that the output of the coupling 1 should be decreased a proportionate amount, it will be noted that the valve member 30 will initially be positioned upwardly a proportionate amount, causing an increase in the fluid pressure transmitted to the valves 11 and 12. The valve 11 will remain in the closed position, whereas the valve 12 will open an amount proportional to the change in pressure within the pipe 15, thereby transferring fluid from the working circuit of the hydraulic coupling to the reservoir and causing a decrease in coupling output. Gradually fluid pressure will seep through the needle valve 33 to the bellows 30A until it is equal to the pressure within pipe 15 effecting a gradual downward positioning of the member 30 of predetermined amount, thereby causing a gradual decrease in the pressure transmitted to the valve 12, causing it to be positioned in a closing direction, thereby decreasing the rate at which the coupling output is decreased. As the coupling output decreases, the force produced by the diaphragm 25 will decrease and restore the bell crank 23 toward the neutral position, and when the coupling output has changed in desired proportion to the change in position of the Bourdon tube 16 the bell crank 23 will be restored to the neutral position when both valves 11 and 12 will be in the closed position.

Upon a change in position of the Bourdon tube 16 in opposite direction, that is in a clockwise direction, an opposite change in fluid pressure within the pipe 15 is effected, thereby causing the valve 11 to open and transfer fluid from the reservoir to the coupling to effect an increase in coupling output. Initially the decrease in pressure within the pipe 15 will be proportional to the change in position of the Bourdon tube 16. However, the pressure fluid will gradually seep from the bellows 30A thereby causing a gradual increase in pressure within the pipe 15, so that the rate at which the coupling output increases will gradually diminish.

It will be noted that the control system I have so far disclosed acts to give an immediate and relative rapid change in the volume of fluid in the working circuit and thereafter to change the volume of fluid at a progressively decreasing rate, which is gradually reduced to zero as the actual coupling output reaches the desired coupling output. By providing the immediate and relative rapid change I provide for the inherent time lag present in hydraulic couplings, so that even during the transient period when the fluid pressure within the pipe 21 is changing, the actual coupling output will remain substantially in proportion thereto. By providing for a gradually diminishing rate of fluid volume change I approach the desired coupling output asymptotically, so that there is no tendency for overshooting or hunting which might otherwise occur.

Figure 2:
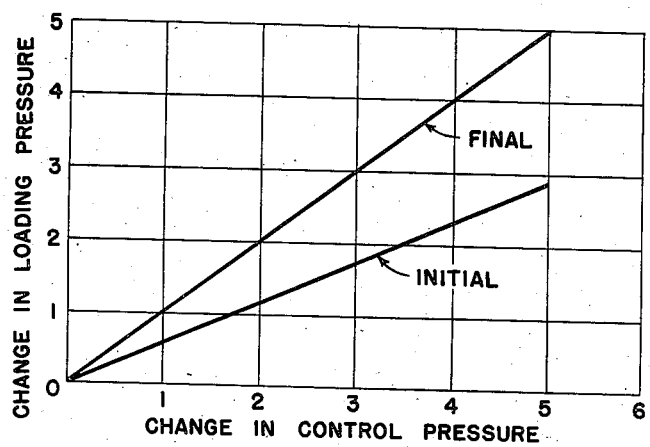

In Fig. 2 I have graphically shown the relationship between initial and final changes in the control pressure existing within the pipe 15 for given changes in loading pressure produced by the pilot valve 18. The initial change in control pressure may be considered as that pressure existing within the pipe 15 immediately after a change in position of the valve member 17 has occurred, and the final control pressure as the pressure existing within the pipe 15 after pressures within the bellows 30A and pipe 15 have equalized but before there has been a change in actual coupling output. Referring to Fig. 2, and assuming that there has been a change in loading pressure of two units, there will be an immediate change in the control pressure of approximately 3.5 units. Gradually, however, as pressure fluid seeps through the needle valve 33 the change in control pressure will decrease and ultimately be reduced to a value of approximately 2 units. If now no further change occurred, it is evident that either the valve 11 or 12 would remain open, causing a continuous change in the rate of coupling output. However, as the coupling output changes the force exerted by the diaphragm 25 will change so that ultimately the control pressure will be restored to its original value by the valve member 30 being restored to its neutral position.

It is evident that the initial relationship existing between changes in loading pressure and changes in control pressure as shown in Fig. 2 may be varied by changing the point of connection of the movable member 30 on the beam 29, or by changing the position of the bellows 30A. Thus by moving the member 30 to the left along the beam 29 as shown in the drawing, it is evident that a given change in loading pressure will produce a greater initial change in the control pressure. Likewise, the difference between the initial and final control pressures may be varied by changing the effective length of the spring 35.

Figure 3:
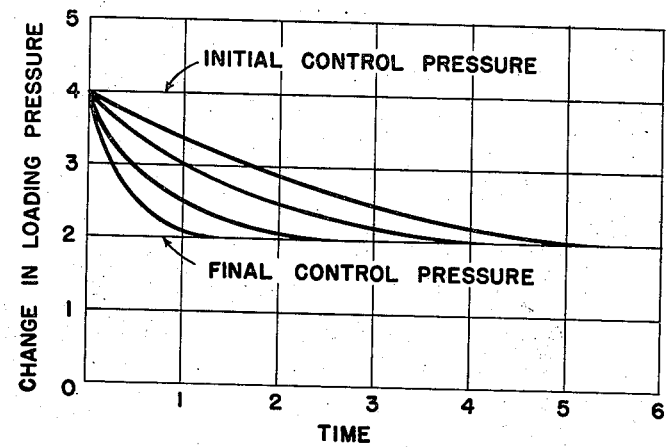

By varying the port area of the needle valve 33 I may change the rate of bleed between chamber 30A and pipe 15 and thereby vary the rate at which change from initial to final control pressure occurs and thereby vary the rate at which the fluid volume in the working circuit is varied. In Fig. 3 I have graphically illustrated the effect produced by changing the port area of the needle valve 33. With a relatively large bleed it will be noted that the control pressure will diminish at a rapid rate from the initial to the final condition. As the port area is gradually decreased the time required for the pressure within the pipe 15 to diminish from the initial to the final value is increased, and it is apparent that when the needle valve 33 is closed an infinite amount of time would be required for the control pressure to diminish from the initial to the final value. Through adjustment of the needle valve 33 I may provide for varying characteristics of different couplings, so that a change in output may be consummated as rapidly as possible without overshooting or hunting.

Figure 4:
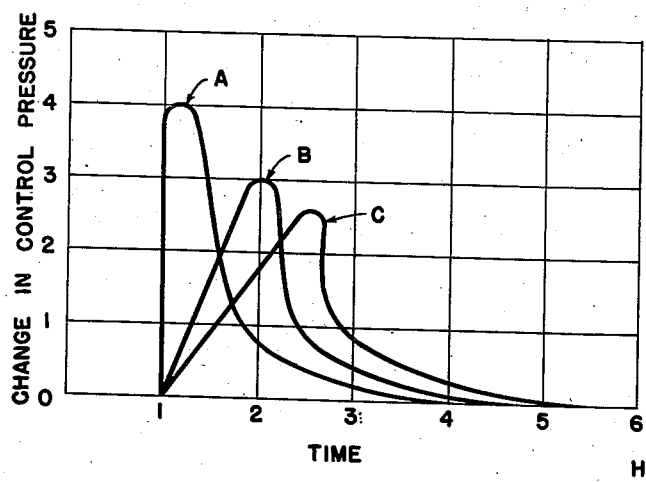

In discussing the operation of my control system with reference to Figs. 2 and 3, I have assumed substantially instantaneous changes in the position of the Bourdon tube 16. Normally, however, such changes will not occur instantaneously but at various rates. Under such conditions the initial change in control pressure will not be determined solely by the displacement of the valve member 17, but will in part be determined by the rate at which the position of the member 17 is changing. This will be evident when it is considered that if the entire displacement of the member 17 does not occur instantaneously, pressure fluid will bleed between the bellows 30A and pipe 15 during the time that the position of the member 17 is changing, thereby simultaneously modifying the position of the valve member 30. I have graphically illustrated this operation of my control system in Fig. 4. Curve A may be taken as representative of the relationship between control pressure within the pipe 15 and time upon an instantaneous displacement of the valve member 17 of a predetermined amount. Curve B represents the relationship between control pressure and time when the same total displacement of the valve member 17 occurs, but which does not occur instantaneously. Curve C represents the control pressure obtained when the same total displacement of the member 17 occurs over a still longer period of time, or at a slower rate. It will be noted that as the rate of change in position of the member 17 decreases the maximum initial change in control pressure likewise diminishes. It will thus be evident that upon rapid changes in the magnitude of the controlled condition my control system will operate to give a relatively large and immediate change in rate of coupling output, whereas with relatively slow changes in the magnitude of the controlled condition changes in coupling output will occur at a relatively slower rate. Accordingly the rate of change of coupling output will correspond to the rate of change in the magnitude of the controlled condition.

It is sometimes impossible to economically obtain the entire range in coupling output desired with a single speed driving motor and it is therefore common practice to provide a motor having two or more speeds and selectively determine the speed used in accordance with the rate of coupling output. With the motor at low speed, desired changes in coupling output are effected by varying the volume of fluid in the coupling until it is substantially full of fluid, when a further desired increase in coupling output is effected by changing the speed of the driving means a predetermined amount. In order to prevent an excessive change in coupling output simultaneously with increase in motor speed, it is necessary to withdraw fluid from the coupling. As the change in coupling output occasioned by the change in motor speed occurs at a relatively rapid rate, it is desirable to withdraw fluid from the coupling at a correspondingly rapid rate if a temporary change in output of relatively large magnitude during the transition period is to be avoided. In order to effect the relatively rapid withdrawal of fluid necessary, I have found it desirable in addition to the normal control means to provide additional control means operative during the transition period to effect a rapid withdrawal of fluid.

With the motor at high speed, decreases in coupling output are obtained by withdrawing fluid from the coupling until it is substantially empty, when the speed of the motor is decreased, and concurrently therewith the quantity of fluid in the coupling increased. As the transition period during which the motor speed is decreasing is relatively long, the normal control means in most instances can act rapidly enough to prevent a temporary decrease in coupling output during the transition period. As explained more in detail hereinafter, however, I may incorporate suitable means if necessary to prevent a decrease in coupling output during the transition period between high and low motor speeds.

To prevent the motor speed from continually changing, at times when the coupling output coincides with that output at which the speed of the motor is changed from low to high for example, it is desirable to provide a certain amount of overlap, that is to change the motor speed from low to high at a greater coupling output than the output at which the motor speed is reduced from high to low. In Fig. 5 I have graphically illustrated the desired operation. With the motor at low speed, changes in output are made by changing the quantity of fluid in the coupling until the point D is reached, when the coupling is substantially full of fluid. At this point the motor speed is changed so that the percent of motor speed transmitted through the coupling is reduced. Desirably during this transition period the percent of maximum coupling output remains constant, so that the point D' is on the same horizontal line as the point D. In order to obtain this operation during the transition period, as hereinbefore stated, it is necessary to withdraw fluid from the working circuit of the coupling at a relatively rapid rate. With the motor on high speed, increases in coupling output are obtained through the normal control means by increasing the quantity of fluid in the hydraulic coupling. Assuming the motor to be at high speed, decreases in coupling output are obtained by decreasing the quantity of fluid in the coupling until a point E is reached, when the motor speed is reduced. Again it is desirable that the percent of maximum coupling output at the reduced motor speed be the same as before the speed reduction. That is, that the point E' lies on the same horizontal line as the point E. It will be noted that the point E is preferably not on the same horizontal line with the point D, so that if the coupling output coincides with either of the points a continual changing of motor speed will not occur. The amount of overlap provided can, of course, be varied to suit the particular conditions met with in any given installation.

In the embodiment of my invention I have shown at Fig. 1 the motor 4 is connected to a source 4A through a resistance 41, thereby causing the motor to rotate at low speed. When it is desired to operate the motor at high speed the resistance 41 is shunted out. The resistance 41 has been shown as a means for changing the motor speed merely for simplicity and convenience. It will be evident from the explanation to follow that my control system is not concerned with the particular means employed to cause operation of the input shaft at various speeds.

A study of Fig. 1 will indicate that the fluid pressure established by the pilot valve 18 is a measure of coupling output and quantity of fluid in the coupling, and I may therefore effect operation of the speed changing means when this pressure reaches predetermined values. Connected to the pipe 21 are pressure switches 50 and 51 positioned to closed position when the pressure in the pipe 21 reaches predetermined values. The switch 50 is adjusted to close when the point corresponding to E—E' (Fig. 5) is reached. The switch 51 is adjusted to operate when the point D—D' is reached. Thus it is the switch 51 which determines the point of transition from low to high motor speed and the switch 50 which determines the point of transition from high to low speed. Assuming that the motor 4 is at low speed, operation of the switch 50 has no effect upon motor speed. Upon further increase in pressure within the pipe 21 to a magnitude indicating that the coupling is substantially full of fluid, the switch 51 will close. As the switch 50 has previously closed, closure of switch 51 will effect energization of a solenoid 56, causing closure of fingers 57 and 58 operated thereby. After initial energization of the solenoid 56, it will remain closed until switch 50 opens, as the circuit is completed through the holding finger 57.

Closure of finger 58 effects energization of a motor 59, causing it to rotate through spur gears 52—53, a shaft 60 carrying cams 61, 62 and 63. Soon after the shaft 60 starts to rotate, cam 61 closes a switch 64 effecting energization of a solenoid 65 operating a three-way valve 66 in the pipe 15. The valve 66, as shown, is in its normal position when pressures established by the pilot valve 31 are effective for positioning the valves 11 and 12. Upon energization of the solenoid 65, however, the pressure established by the pilot valve 31 is rendered ineffective for positioning the valves 11 and 12 and a fluid pressure of predetermined relatively high magnitude admitted through a pipe 66A is substituted therefor. The magnitude of this second fluid pressure is sufficient to cause the valve 12 to move to a wide open position, thereby causing fluid to be transferred from the working circuit of the coupling to the reservoir 9 at a maximum rate.

To further increase the rate at which fluid is withdrawn from the working circuit of the coupling I show disposed in the pipe 7 a three-way diaphragm motor actuated dump valve 67A normally positioned to permit the free passage of fluid through the working circuit. The diaphragm motor of the valve 67A is connected to the pipe 15 through a pipe 68A and is arranged so that upon the predetermined pressure being made available by energization of the solenoid 65, it positions the valve 67A to prevent the circulation of fluid through the working circuit and direct all of the fluid to a pipe 69A leading to the reservoir 9. Energization of the solenoid 65 and consequent rapid removal of fluid from the working circuit will continue for substantially the entire revolution of the cam 61.

Closure of switch 51 effects energization of solenoids 67 and 68, which thereafter will remain energized until switch 50 is opened. A predetermined increment of time after switch 64 is closed a switch 69 is closed by cam 62, which shunts out the resistance 41 and causes the motor 4 to accelerate to high speed. The switch 69 carries an armature 70, which upon being positioned upwardly moves into the magnetic field created by the solenoid 67 and locks the switch 69 in closed position for the duration of the energization of the solenoid. The motor 4 will therefore remain at high speed until the switch 50 is opened.

The motor 59 is deenergized after the shaft 60 has made one revolution by the cam 63, which shortly before the termination of the revolution causes cooperating contacts 71—72 to move upwardly. The contact 72 carries an armature 73, which is moved into the magnetic field of the solenoid 68 thereby causing its disengagement with the contact 71 upon further rotation of the cam and consequent stopping of the motor 59. Deenergization of the solenoid 68 will cause reengagement of contacts 71—72, so that the device is reset to starting position.

From the start of the motor 4 the sequence of events may be summarized as follows: As the coupling output increases the normal control will operate to vary the fluid volume in the coupling correspondingly. At the coupling output designated by the point E' (Fig. 5) the switch 50 will close. At the coupling output designated by the point D the switch 51 will close. Immediately thereafter valve 12 will be opened wide and valve 67A positioned to dump fluid from the coupling working circuit to the reservoir 9. A predetermined increment of time thereafter the resistance 41 will be shunted out and the motor accelerated to high speed. After a further predetermined increment of time the valves 11 and 12 will be returned to normal control from the pilot valve 31, and the valve 67A will be positioned so that fluid is again allowed to circulate through the working circuit of the coupling.

By varying the length of the land of the cam 61 it is evident that I may vary the time period during which the valve 12 is opened wide and the valve 67A positioned to dump fluid into the reservoir 9. Likewise by changing the position of the land on the cam 62 the increment of time preceding the actual acceleration of the motor 4 and during which the valves 12 and 67A are positioned to a wide open position may be varied. Likewise I may vary the total time period during which the solenoid 65 is energized by changing the ratio of the spur gears 52—53 or speed of the motor 59.

Upon a decrease in coupling output the motor will stay on high speed until the point E (Fig. 5) is reached, when the shunt circuit will be broken through opening of switch 50 and consequent deenergization of solenoid 67. The motor will then decelerate to low speed. As hereinbefore stated, because of the longer transition period during which the motor speed is being reduced, I have found it is usually not necessary to provide other than the normal control means to increase the volume of fluid in the coupling to maintain the output substantially constant throughout that period. Reference to Fig. 1 will indicate that any change in the actual coupling output as indicated by the metering device 24 from the desired coupling output, as indicated by the pressure within the pipe 21 or force produced by the bellows 22 will result in a change in the actual coupling output to restore correspondence with that desired. Thus during deceleration periods of the motor 4 the force produced by the diaphragm 25 will become less, due to the decrease in actual coupling output, and cause the valve member 30 to move downwardly, thus decreasing the pressure within the pipe 15, resulting in the valve 11 opening and permitting fluid to enter the coupling, thus tending to restore the actual rate of coupling output to that desired. Usually the deceleration period is sufficiently long so that the actual coupling output will not depart from that desired an appreciable amount. In some instances, however, depending upon the type of speed changing mechanism employed, I find it desirable to provide means for introducing fluid into the coupling at an excessive rate during deceleration periods. Briefly, my invention comprehends exhausting fluid pressure in the pipe 15 to atmosphere during deceleration periods, thereby causing the valve 11 to immediately position to a wide open position and permit fluid to enter the coupling at a maximum rate.

In Fig. 1 I show disposed in the pipe 15 a three-way solenoid actuated valve 100. In the normal deenergized position, as shown, the valve permits the free passage of fluid pressure through the pipe 15. During periods of deceleration the solenoid is energized, causing its associated valve member to move upwardly and vent the fluid pressure impressed on the motors of the valves 11, 12 and 67 to atmosphere. The valve 11 is so designed that under this condition it opens wide so that fluid is introduced into the coupling at a maximum rate. As energization of the solenoid valve 100 is only momentary, I provide a suitable time delay means, such as a dashpot indicated at 101, so that the length of time that the motors of the valves 11, 12 and 67A are in communication with the atmosphere may be made to correspond in any desired way with the deceleration period of the motor 4.

The solenoid valve 100 is energized by closure of a normally open pivotally mounted mercury switch 102. Closure of the switch at the proper instant is obtained by providing the movable switch member of the solenoid 56 with a horizontal foot piece 103, which is arranged to strike an actuator 104 in its downward stroke and cause momentary tilting of the mercury switch in a counterclockwise direction, which then returns to the normal position by gravity. As hereinbefore explained, deenergization of the solenoid 56 effects deceleration of the motor 4, so that at the instant of deceleration the solenoid valve 100 will be energized and the motors of valves 11, 12 and 67A brought into communication with the atmosphere for an increment of time depending upon the adjustment of the dashpot 101. As the actuator 104 is pivotally mounted to the mercury switch 102, upward movement of the foot member 103 does not position the mercury switch 102.

It should be understood that the description and drawings merely serve to illustrate a representative application of my invention and are not to be considered as defining the scope thereof.

What I claim as new, and desire to secure by Letters Patent of the United States is:

1. In combination with a hydraulic coupling having an input and an output shaft and containing a volume of fluid, a multispeed motor for driving said input shaft, valve means for regulating the flow of fluid to and from the coupling to vary the volume therein normally under the control of a first fluid pressure, and means for changing the speed of the motor when the fluid pressure reaches a predetermined value and simultaneously placing said valve means under the control of a second fluid pressure for a predetermined period of time to effect the change in fluid volume at a maximum rate and in a sense to counteract the change in motor speed.

2. In combination with a hydraulic coupling having an input and an output shaft and containing a volume of fluid, a multispeed motor for driving the coupling, means sensitive to a first control effect for normally producing changes in the volume of fluid in the coupling to produce a change in coupling output corresponding to changes in the control effect, and means operable upon the control effect reaching a predetermined magnitude and adapted to change the speed of the motor and simultaneously effect a change in fluid volume in the coupling to produce a change in coupling output corresponding to the change in output produced by the change in motor speed but in opposite sense.

3. In combination with a hydraulic coupling having an input and an output shaft and containing a volume of fluid, a multispeed motor for driving the coupling, valve means for varying the volume of fluid in the coupling to effect desired changes in rate of coupling output, and means operable upon the coupling output reaching a predetermined value for changing the speed of the motor in selected sense and simultaneously changing the volume of fluid in the coupling in a sense to counteract the change in motor speed so that the rate of coupling output is substantially the same after the change in motor speed as before the change in motor speed.

4. In combination with a hydraulic coupling having a fluid reservoir and a fluid circulating system containing a fixed volume of fluid, a multispeed motor for driving the coupling, means for normally transferring fluid from the circulating system to the reservoir and vice versa to effect desired changes in coupling output, means operable at a predetermined coupling output adapted to increase the speed of the motor and temporarily direct the fluid passing through the circulating system to the reservoir to effect a decrease in rate of coupling output corresponding with but in opposite sense to the increase in coupling output caused by the increase in motor speed.

5. In combination with a hydraulic coupling having a fluid reservoir and a fluid circulating system containing a fixed volume of fluid, a multispeed motor for driving the coupling, means for normally transferring fluid from the circulating system to the reservoir and vice versa to effect desired changes in coupling output, a three-way valve in the fluid circulating system having a connection to the fluid reservoir and normally positioned to permit passage of fluid through the circulating system and prevent fluid flow from the circulating system to the reservoir, means operable at a predetermined coupling output adapted to increase the speed of the motor to increase the coupling output and for temporarily positioning the three-way valve to prevent fluid flow thorugh the circulating system and permit fluid flow from the circulating system to the reservoir to effect a decrease in coupling output.

6. In combination with a hydraulic coupling having a fluid reservoir and a fluid circulating system containing a fixed volume of fluid, a multispeed motor for driving the coupling, means for normally transferring fluid from the circulating system to the reservoir and vice versa to effect desired changes in coupling output, means operable at a predetermined coupling output adapted to cause said first named means to transfer fluid from the circulating system to the reservoir at a maximum rate for a predetermined increment of time, and means operable after a portion of the predetermined time increment has elapsed for increasing the speed of the motor so that the coupling output remains substantially constant throughout the change in motor speed.

HARVARD H. GORRIE.